(12) United States Patent
Park et al.

(10) Patent No.: US 12,502,995 B2
(45) Date of Patent: Dec. 23, 2025

(54) BATTERY CONDITIONING SYSTEM AND METHOD

(71) Applicants: Hyundai Motor Company, Seoul (KR); Kia Corporation, Seoul (KR)

(72) Inventors: Hyun Soo Park, Seoul (KR); Tae Hyuck Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 683 days.

(21) Appl. No.: 17/893,776

(22) Filed: Aug. 23, 2022

(65) Prior Publication Data

US 2023/0150384 A1    May 18, 2023

(30) Foreign Application Priority Data

Nov. 18, 2021   (KR) .................. 10-2021-0159434

(51) Int. Cl.
| | |
|---|---|
| *B60L 53/62* | (2019.01) |
| *B60L 53/30* | (2019.01) |
| *B60L 53/66* | (2019.01) |
| *B60L 53/68* | (2019.01) |
| *G01R 31/385* | (2019.01) |
| *G01R 31/396* | (2019.01) |
| *H01M 10/44* | (2006.01) |
| *H02J 7/00* | (2006.01) |

(52) U.S. Cl.
CPC ............. *B60L 53/62* (2019.02); *B60L 53/305* (2019.02); *B60L 53/66* (2019.02); *B60L 53/68* (2019.02); *G01R 31/385* (2019.01); *G01R 31/396* (2019.01); *H01M 10/446* (2013.01); *H02J 7/00036* (2020.01); *H02J 7/00712* (2020.01)

(58) Field of Classification Search
CPC .......... B60L 53/00; B60L 53/14; B60L 53/62; B60L 53/64; B60L 53/65; B60L 53/66; B60L 53/68; B60L 53/305; B60L 58/10; B60L 58/12; B60L 2240/62; B60L 2240/66; B60L 2240/70; B60L 2260/46; B60L 2260/48; B60L 2260/50; B60L 2260/52; G01R 31/385; G01R 31/396; G16Y 10/40; G16Y 20/10; G16Y 20/20; G16Y 20/30; G16Y 40/10; G16Y 40/20; G16Y 40/35; H01M 10/441; H01M 10/446; H02J 7/00036; H02J 7/00712; Y02T 10/70; Y02T 10/7072; Y02T 90/12
USPC ........................................................ 320/109
See application file for complete search history.

(56) References Cited

U.S. PATENT DOCUMENTS

| | | | | |
|---|---|---|---|---|
| 7,359,435 | B2 * | 4/2008 | Felbecker ................. | H04L 1/20 375/224 |
| 8,620,506 | B2 * | 12/2013 | Kummer ................. | B60L 58/12 180/65.21 |

(Continued)

FOREIGN PATENT DOCUMENTS

KR    10-2021-0054158 A    5/2021

*Primary Examiner* — Drew A Dunn
*Assistant Examiner* — Frank Alexis Silva
(74) *Attorney, Agent, or Firm* — Fox Rothschild LLP

(57) ABSTRACT

A battery conditioning system and method configured to shorten charging time and block energy consumption due to unnecessary conditioning by performing battery pre-conditioning in a timely manner through collecting customer charging tendency data, etc., using big data and generating a charging scenario by combining charge-inducing factors to perform pre-conditioning.

13 Claims, 5 Drawing Sheets

(56) References Cited

U.S. PATENT DOCUMENTS

| | | | |
|---|---|---|---|
| 8,686,687 B2* | 4/2014 | Rossi | H02J 13/00034 |
| | | | 307/18 |
| 9,288,270 B1* | 3/2016 | Penilla | H04L 67/141 |
| 9,365,121 B2* | 6/2016 | Kim | B60L 50/16 |
| 9,401,610 B2* | 7/2016 | Uyeki | B60L 53/64 |
| 9,426,225 B2* | 8/2016 | Penilla | B60L 53/65 |
| 9,539,998 B2* | 1/2017 | Geller | B60W 10/10 |
| 9,672,666 B2* | 6/2017 | Shin | G07C 5/0841 |
| 9,834,114 B2* | 12/2017 | Hettrich | H04W 4/029 |
| 10,040,365 B2* | 8/2018 | Pflaum | G06Q 10/06 |
| 10,225,350 B2* | 3/2019 | Penilla | B60L 53/80 |
| 10,300,808 B2* | 5/2019 | Newman | B60L 58/13 |
| 10,369,899 B2* | 8/2019 | Hettrich | B60L 58/27 |
| 10,554,759 B2* | 2/2020 | Penilla | B60L 53/65 |
| 10,587,127 B2* | 3/2020 | Sugeno | H02J 7/04 |
| 10,656,211 B2* | 5/2020 | Ha | B60L 50/50 |
| 10,710,460 B2* | 7/2020 | Beer | B60L 53/14 |
| 10,723,238 B2* | 7/2020 | Hortop | H02J 7/0071 |
| 10,800,287 B2* | 10/2020 | Vallender | B60L 58/12 |
| 11,040,635 B2* | 6/2021 | Hettrich | H04W 4/029 |
| 11,072,258 B2* | 7/2021 | Kumar | B60L 50/16 |
| 11,541,777 B2* | 1/2023 | Kim | H01M 10/6563 |
| 11,577,623 B2* | 2/2023 | Kim | B60L 58/16 |
| 11,673,486 B2* | 6/2023 | Hettrich | B60L 58/27 |
| | | | 701/2 |
| 11,715,136 B2* | 8/2023 | Khoo | H04L 67/10 |
| | | | 700/286 |
| 11,748,788 B2* | 9/2023 | Khoo | G06Q 10/02 |
| | | | 700/286 |
| 11,756,086 B2* | 9/2023 | Khoo | G08G 1/144 |
| | | | 700/286 |
| 11,953,860 B2* | 4/2024 | Park | G01R 31/3648 |
| 12,077,059 B2* | 9/2024 | Salter | B60L 53/37 |
| 12,083,920 B2* | 9/2024 | Mannepalli | B60L 53/63 |
| 12,170,455 B1* | 12/2024 | Zauli | H02J 3/32 |
| 12,175,506 B2* | 12/2024 | Khoo | B60L 53/68 |
| 2009/0114463 A1* | 5/2009 | DeVault | B60W 20/12 |
| | | | 180/65.29 |
| 2012/0316810 A1* | 12/2012 | Syed | H01M 10/42 |
| | | | 702/85 |
| 2013/0110296 A1* | 5/2013 | Khoo | G06Q 50/06 |
| | | | 700/286 |
| 2013/0141043 A1* | 6/2013 | Rossi | B60L 53/665 |
| | | | 320/109 |
| 2013/0166119 A1* | 6/2013 | Kummer | H01M 10/625 |
| | | | 701/22 |
| 2013/0179061 A1* | 7/2013 | Gadh | B60L 53/305 |
| | | | 701/1 |
| 2013/0346345 A1* | 12/2013 | Osogami | G06Q 30/0283 |
| | | | 705/412 |
| 2014/0217976 A1* | 8/2014 | Mcgrath | B60L 15/2045 |
| | | | 320/109 |
| 2015/0077054 A1* | 3/2015 | Uyeki | B60L 53/11 |
| | | | 320/109 |
| 2015/0165916 A1* | 6/2015 | Kim | B60L 58/14 |
| | | | 320/109 |
| 2015/0332519 A1* | 11/2015 | Hiura | G07C 5/08 |
| | | | 701/33.4 |
| 2016/0059733 A1* | 3/2016 | Hettrich | B60L 58/27 |
| | | | 701/2 |
| 2016/0080500 A1* | 3/2016 | Penilla | B60W 50/0098 |
| | | | 709/226 |
| 2016/0084917 A1* | 3/2016 | Nam | H02J 7/005 |
| | | | 324/432 |
| 2016/0198002 A1* | 7/2016 | Penilla | H04L 67/125 |
| | | | 709/228 |
| 2016/0210795 A1* | 7/2016 | Shin | G07C 5/008 |
| 2016/0297416 A1* | 10/2016 | Geller | B60W 20/00 |
| 2016/0311423 A1* | 10/2016 | Storm | B60L 50/40 |
| 2016/0339792 A1* | 11/2016 | Khoo | G06Q 30/0206 |
| 2016/0359980 A1* | 12/2016 | Penilla | G06Q 10/20 |
| 2016/0364776 A1* | 12/2016 | Khoo | G01C 21/3492 |
| 2017/0176195 A1* | 6/2017 | Rajagopalan | B60L 58/12 |
| 2017/0236064 A1* | 8/2017 | Kirschnick | F01D 21/003 |
| | | | 702/35 |
| 2017/0305294 A1* | 10/2017 | Hettrich | H04W 4/029 |
| 2018/0031642 A1* | 2/2018 | Sung | G01R 31/367 |
| 2018/0261893 A1* | 9/2018 | Fujita | H02J 7/005 |
| 2018/0304765 A1* | 10/2018 | Newman | B60L 58/26 |
| 2018/0345800 A1* | 12/2018 | Beer | B60L 53/18 |
| 2019/0039467 A1* | 2/2019 | Hortop | H02J 7/0071 |
| 2019/0176639 A1* | 6/2019 | Kumar | B60L 3/0046 |
| 2019/0199800 A1* | 6/2019 | Penilla | G01C 21/3641 |
| 2019/0202314 A1* | 7/2019 | Boeswald | B60L 53/18 |
| 2019/0202414 A1* | 7/2019 | Shih | B60L 53/665 |
| 2019/0207267 A1* | 7/2019 | Vickery | B60L 53/80 |
| 2019/0207398 A1* | 7/2019 | Shih | B60L 53/53 |
| 2019/0212392 A1* | 7/2019 | Ha | B60L 58/12 |
| 2019/0359083 A1* | 11/2019 | Hettrich | B60L 58/27 |
| 2020/0016993 A1* | 1/2020 | Imai | G08G 1/096775 |
| 2020/0055406 A1* | 2/2020 | Vallender | B60L 58/12 |
| 2020/0055415 A1* | 2/2020 | Littrell | B60L 3/12 |
| 2020/0055419 A1* | 2/2020 | Kim | G06Q 10/02 |
| 2020/0070679 A1* | 3/2020 | Wang | B60L 58/21 |
| 2020/0073653 A1* | 3/2020 | Jeong | G06F 1/329 |
| 2020/0086868 A1* | 3/2020 | Seo | B60W 30/16 |
| 2020/0101850 A1* | 4/2020 | Harty | B60L 55/00 |
| 2020/0156495 A1* | 5/2020 | Lindup | G05B 13/042 |
| 2020/0180465 A1* | 6/2020 | Watson | B60L 53/65 |
| 2020/0198494 A1* | 6/2020 | Chen | H01M 10/441 |
| 2020/0262312 A1* | 8/2020 | Kim | H01M 10/613 |
| 2020/0282860 A1* | 9/2020 | Kim | B60L 58/10 |
| 2020/0307621 A1* | 10/2020 | Ostrowski | B60K 35/00 |
| 2020/0334722 A1* | 10/2020 | Kurimoto | G06Q 30/0284 |
| 2020/0338959 A1* | 10/2020 | Carlson | H01M 10/615 |
| 2020/0393259 A1* | 12/2020 | Gantt, Jr. | B60L 53/65 |
| 2021/0050631 A1* | 2/2021 | Li | H01M 10/446 |
| 2021/0073876 A1* | 3/2021 | Khoo | G06Q 30/0206 |
| 2021/0090139 A1* | 3/2021 | Khoo | B60L 53/14 |
| 2021/0090141 A1* | 3/2021 | Khoo | H04L 63/10 |
| 2021/0138928 A1* | 5/2021 | O'Gorman | B60L 50/50 |
| 2021/0143649 A1* | 5/2021 | Sherback | B60L 58/26 |
| 2021/0146794 A1* | 5/2021 | Ruan | H02J 7/00032 |
| 2021/0268936 A1* | 9/2021 | Hettrich | H04W 4/029 |
| 2021/0325833 A1* | 10/2021 | Park | G01R 31/3648 |
| 2021/0347361 A1* | 11/2021 | Park | B60W 40/107 |
| 2021/0362702 A1* | 11/2021 | Park | B60L 58/12 |
| 2022/0027436 A1* | 1/2022 | Shida | G06F 17/18 |
| 2022/0072975 A1* | 3/2022 | O'Gorman | B60L 53/00 |
| 2022/0118883 A1* | 4/2022 | Park | G07C 5/008 |
| 2022/0147035 A1* | 5/2022 | Rodemann | G06Q 10/063 |
| 2022/0185135 A1* | 6/2022 | Langton | B60L 58/12 |
| 2022/0185142 A1* | 6/2022 | Park | G01R 31/385 |
| 2022/0250506 A1* | 8/2022 | Goldman-Shenhar | |
| | | | G01C 21/3469 |
| 2022/0281345 A1* | 9/2022 | Kim | B60L 53/66 |
| 2022/0289069 A1* | 9/2022 | Ferguson | H02J 7/005 |
| 2022/0305942 A1* | 9/2022 | Mannepalli | B60L 53/68 |
| 2022/0371473 A1* | 11/2022 | Hettrich | H04W 4/029 |
| 2023/0001818 A1* | 1/2023 | Shaotran | B60L 53/305 |
| 2023/0001824 A1* | 1/2023 | Shaotran | H01M 10/633 |
| 2023/0004901 A1* | 1/2023 | Shaotran | B60L 50/60 |
| 2023/0011148 A1* | 1/2023 | Jeong | B60L 58/16 |
| 2023/0012166 A1* | 1/2023 | Disley | B60L 53/68 |
| 2023/0048344 A1* | 2/2023 | Lee | B60L 58/26 |
| 2023/0061401 A1* | 3/2023 | Li | H02J 7/0013 |
| 2023/0076816 A1* | 3/2023 | Salter | B60L 53/37 |
| 2023/0099547 A1* | 3/2023 | Mandel-Senft | H02J 7/00032 |
| | | | 320/109 |
| 2023/0108029 A1* | 4/2023 | Salter | B60K 1/04 |
| | | | 320/109 |
| 2023/0110777 A1* | 4/2023 | Neligan | B60L 53/62 |
| | | | 320/109 |
| 2023/0137357 A1* | 5/2023 | Chopra | H02J 7/007188 |
| 2023/0159015 A1* | 5/2023 | Lee | B60W 10/26 |
| | | | 701/22 |
| 2023/0259116 A1* | 8/2023 | Matsumoto | G05B 23/0275 |
| | | | 702/183 |
| 2023/0264600 A1* | 8/2023 | Park | B60L 58/16 |
| | | | 320/109 |
| 2023/0280720 A1* | 9/2023 | Kim | B60L 58/24 |

(56) References Cited

U.S. PATENT DOCUMENTS

| | | | |
|---|---|---|---|
| 2023/0368014 A1* | 11/2023 | Akarvardar | G06F 18/2431 |
| 2023/0410162 A1* | 12/2023 | Khoo | B60L 53/65 |
| 2024/0181910 A1* | 6/2024 | Hallberg | B60L 53/31 |
| 2024/0183676 A1* | 6/2024 | Misawa | G06Q 50/06 |
| 2024/0375537 A1* | 11/2024 | Zarrilli | B60L 53/62 |
| 2025/0001900 A1* | 1/2025 | Kim | B60L 53/66 |
| 2025/0033529 A1* | 1/2025 | Shaotran | H01M 10/486 |
| 2025/0042256 A1* | 2/2025 | Kim | G06Q 50/40 |
| 2025/0091478 A1* | 3/2025 | Jehle | H01M 10/44 |
| 2025/0156913 A1* | 5/2025 | Khoo | B60L 53/64 |

* cited by examiner

| charge-inducing factor | condition |
|---|---|
| SOC | 20~30% |
| scenario reliability | 0.5 |

B

| charge-inducing factor | condition |
|---|---|
| day of week | Monday |
| SOC | ~40% |
| location | near company |
| scenario reliability | 0.6 |

C

| charge-inducing factor | condition |
|---|---|
| day of week | Saturday |
| SOC | ~60% |
| estimated mileage | 100km~ |
| weather | sunny |
| scenario reliability | 0.7 |

D

| charge-inducing factor | condition |
|---|---|
| season | winter |
| SOC | 40~50% |
| weather | < 0℃ |
| scenario reliability | 0.3 |

BATTERY CONDITIONING SYSTEM AND METHOD

CROSS-REFERENCE TO RELATED APPLICATION(S)

This application claims, under 35 U. S. C. § 119(a), the benefit of Korean Patent Application No. 10-2021-0159434, filed on Nov. 18, 2021, in the Korean Intellectual Property Office, the disclosure of which is herein incorporated by reference in its entirety.

BACKGROUND

Technical Field

Embodiments of the present disclosure relate to a system and a method for battery conditioning and, more specifically, to a system and a method for generating a scenario which combines factors that induce vehicle charging by utilizing big data, and performing battery preconditioning in conformity therewith.

Description of the Related Art

A battery refers to a device capable of freely converting chemical energy into electric energy, and vice versa, by using electrochemical reactions. Electric vehicles use batteries directly and/or indirectly, and efficient use of battery power is crucial to the driving time and driving capability of electric vehicles.

Moreover, preconditioning technology is used both to preheat batteries and to increase the battery charging efficiency, and thus has a large influence on battery life.

According to conventional battery preconditioning technology, customers' charging tendencies are generalized as preconfigured conditions, and the same preconditioning condition is unilaterally applied to vehicles. For example, when applying a condition to perform preconditioning only if a charging station is set as the destination by using a navigation system, the preconditioning function is unavailable to a driver who is heading for a charging station without using a navigation system. As another example, a condition may be satisfied solely because a charging station is near the destination, even though the driver has no will to charge, and unnecessary preconditioning may thus be performed.

That is, the existing technologies have a problem of degraded accuracy in connection with determining the customer's will to charge or whether or not to actually charge.

The above descriptions regarding existing technologies have been made only to help understanding of the background of the present disclosure, and are not to be deemed by those skilled in the art to correspond to already-known existing technologies.

SUMMARY

Objects of the present disclosure have been proposed to solve the above-mentioned problems, and it is an aspect of the present disclosure to provide a system and a method for battery conditioning. A customer's charging tendency data or the like may be collected by using big data, a charging scenario which combines charging-inducing factors may be generated based thereon, and preconditioning may be performed accordingly, thereby ensuring that battery preconditioning may be performed at an appropriate time so as to reduce the charging time, and preventing energy consumption due to unnecessary conditioning.

In accordance with an aspect of the present disclosure, a battery conditioning system may include: a big data server configured to collect and store vehicle charging tendency factor data; a charge-inducing factor extraction unit configured to select a charging tendency factor with a high charging performance probability as a charge-inducing factor; and a scenario unit configured to generate at least one charging scenario with a high charging performance probability through a combination of charge-inducing factors, and calculate scenario reliability based on an actual charging probability for each charging scenario.

According to an exemplary embodiment, the charge-inducing factor extraction unit may be configured to calculate an actual charging performance probability value for each charging tendency factor, and may be configured to select a charging tendency factor having a probability value equal to or greater than a set value as a charge-inducing factor.

According to an exemplary embodiment, the scenario unit may be configured to calculate a condition with a high charging performance probability for each charge-inducing factor as a charge-inducing condition, and may be configured to configure a scenario including the charge-inducing condition.

According to an exemplary embodiment, the scenario unit may be configured to calculate a scenario reliability value based on an actual number of charging performances after pre-conditioning divided by a number of pre-conditioning performances according to satisfaction of one or more conditions of the charging scenario of the at least one charging scenario.

According to an exemplary embodiment, the scenario unit may be configured to update the each charging scenario of the at least one charging scenario until the scenario reliability value approaches 1 or repeats charging scenario generation for a new charging scenario, and may be configured to determine, for each charging scenario of the at least one charging scenario, the charge-inducing factor of the charging scenario when the reliability value approaches 1.

According to an exemplary embodiment, the scenario unit may be configured to calculate a scenario coverage value corresponding to a number of pre-conditioning performances, according to satisfaction of the one or more conditions of the charging scenario, of the at least one charging scenario, divided by a total number of charges.

According to an exemplary embodiment, the scenario unit may be configured to update the charging scenario until the scenario coverage value approaches 1 or repeats charging scenario generation for a new charging scenario, and may be configured to fix the charging scenario to maintain a corresponding charging scenario when the scenario coverage value approaches 1.

According to an exemplary embodiment, the battery conditioning system may further include a pre-conditioning unit which may be configured to perform pre-conditioning when one or more conditions of one or more of the at least one charging scenario are satisfied.

According to an exemplary embodiment, the charging scenario generated in the scenario unit may be identified by a driver through a display device, and a specific charging scenario may be configured to be deactivated, modified, or added by the driver's will. According to an exemplary embodiment, the big data server may be configured to share a charging scenario generated from each of one or more vehicles with another vehicle. According to an exemplary embodiment, the other vehicle may be configured to use the charging scenario shared with the other vehicle to enable pre-conditioning.

In accordance with another aspect of the disclosure, a method of battery conditioning includes: collecting and storing vehicle charging tendency factor data, using a big data server; selecting a charging tendency factor with a high charging performance probability as a charge-inducing factor, using a charge-inducing factor extraction unit; generating at least one charging scenario with a high charging performance probability through a combination of charge-inducing factors; and determining the at least one charging scenario by calculating scenario reliability based on an actual charging probability for each charging scenario.

According to an exemplary embodiment, the determining the at least one charging scenario may comprise calculating a condition with a high charging performance probability for each charge-inducing factor as a charge-inducing condition, and determining the at least one charging scenario by calculating the scenario reliability comprising the charge-inducing condition.

According to an exemplary embodiment, the method further comprises performing, using a pre-conditioning unit, pre-conditioning when one or more conditions of the one or more of the at least one charging scenario are satisfied.

According to an exemplary embodiment, the determining the scenario may comprise calculating a scenario reliability value according to an actual number of charging performances after pre-conditioning divided by a number of pre-conditioning performances according to satisfaction of the one or more scenario conditions, updating a charging scenario of the at least one charging scenario until the scenario reliability value approaches 1 or repeats charging scenario generation for a new charging scenario, and determining the charge-inducing factor of the charging scenario when the reliability value approaches 1.

According to an exemplary embodiment, the determining the scenario may further comprise calculating a scenario coverage value corresponding to a number of pre-conditioning performances, according to satisfaction of the one or more conditions, divided by a total number of charges, updating the charging scenario until the scenario coverage value approaches 1 or repeats charging scenario generation for a new charging scenario, and maintaining the corresponding scenario when the coverage value approaches 1.

According to an exemplary embodiment, the method may further comprise charging scenario sharing comprising sharing, using the big data server, a charging scenario generated from each of one or more vehicles with another vehicle. The other vehicle may be configured to use the charging scenario shared with the other vehicle to enable pre-conditioning.

A system and a method for battery conditioning according to the present disclosure are advantageous in that battery preconditioning may be performed at an appropriate time so as to reduce the charging time, and energy consumption, due to unnecessary conditioning, may be prevented.

BRIEF DESCRIPTION OF THE DRAWINGS

FIG. 5 is an exemplary diagram illustrating an example of calculating scenario reliability for each scenario according to an exemplary embodiment of the present disclosure.

DETAILED DESCRIPTION OF THE EXEMPLARY EMBODIMENTS

Figure 1:
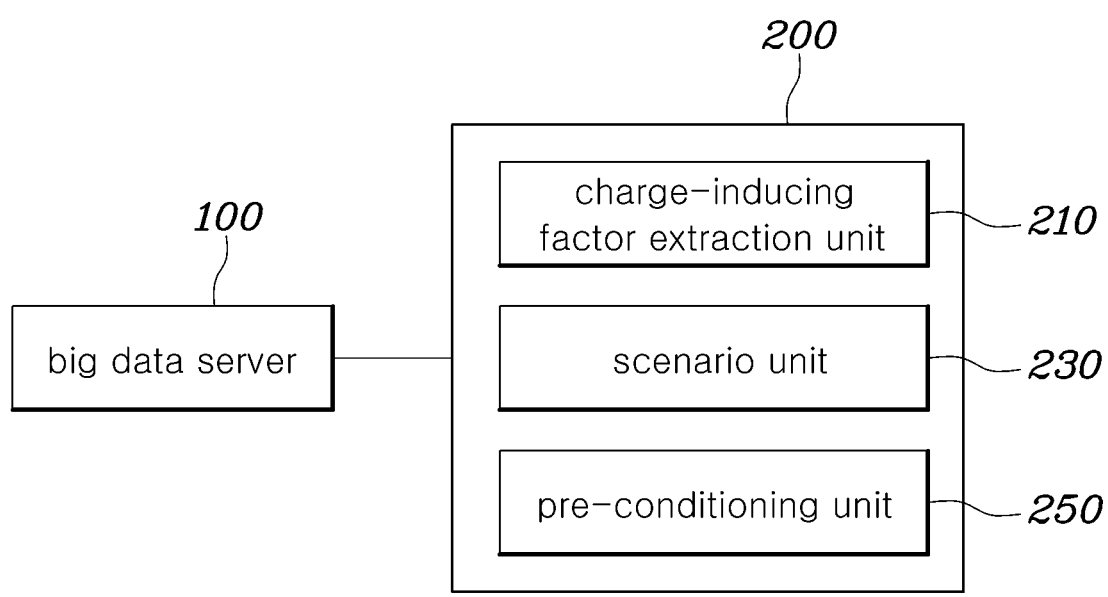
FIG. 1 is a conceptual diagram of a battery conditioning system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 2:
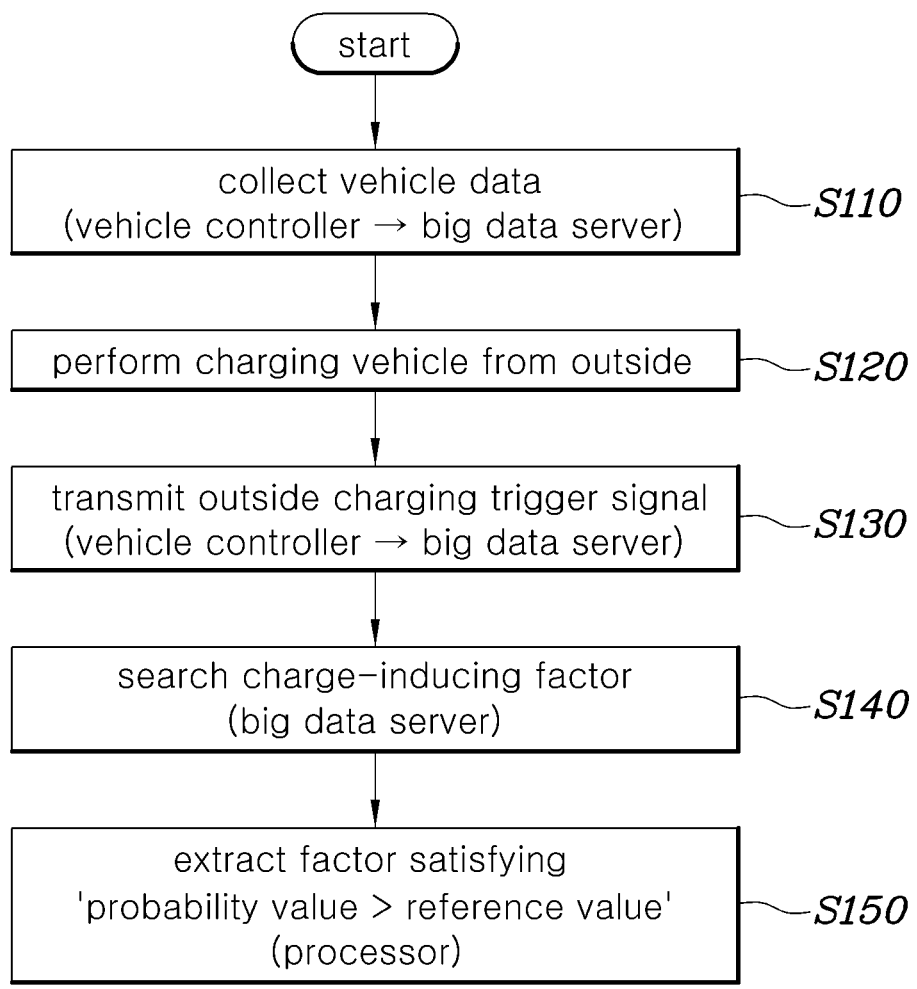
FIG. 2 is a flowchart illustrating a process of extracting a charge-inducing factor according to an exemplary embodiment of the present disclosure.
Figure 3:
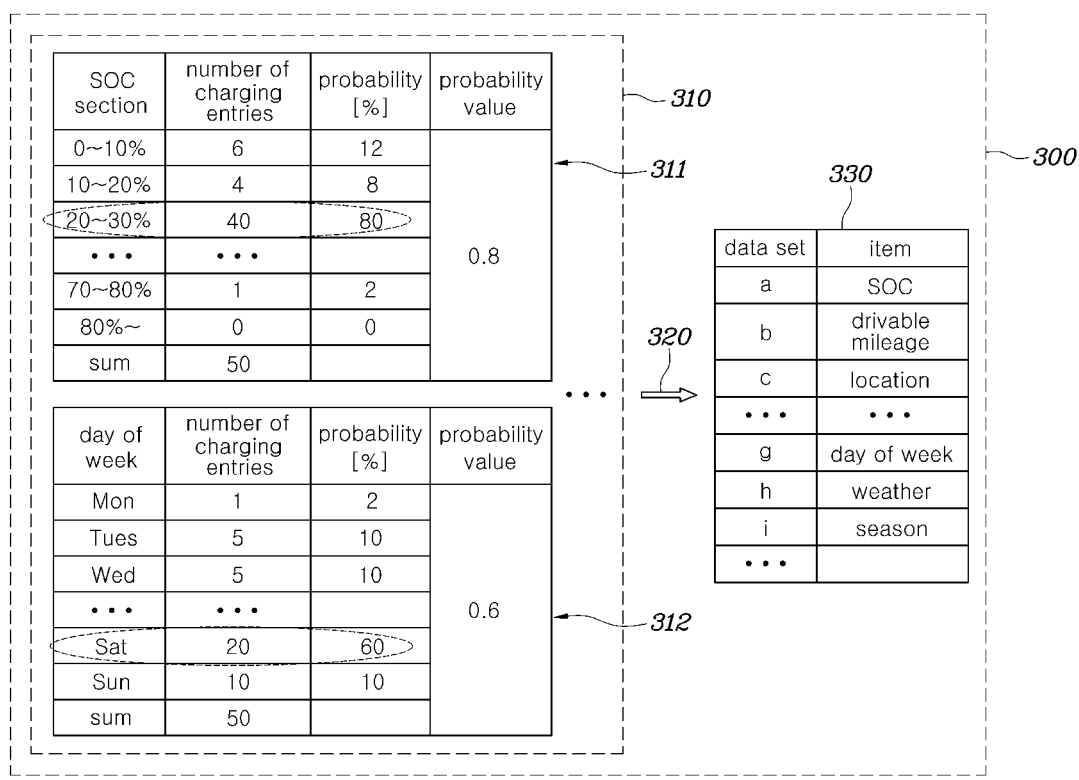
FIG. 3 is an exemplary diagram illustrating an example of a process of searching for a charge-inducing factor of the present disclosure.
Figure 4:
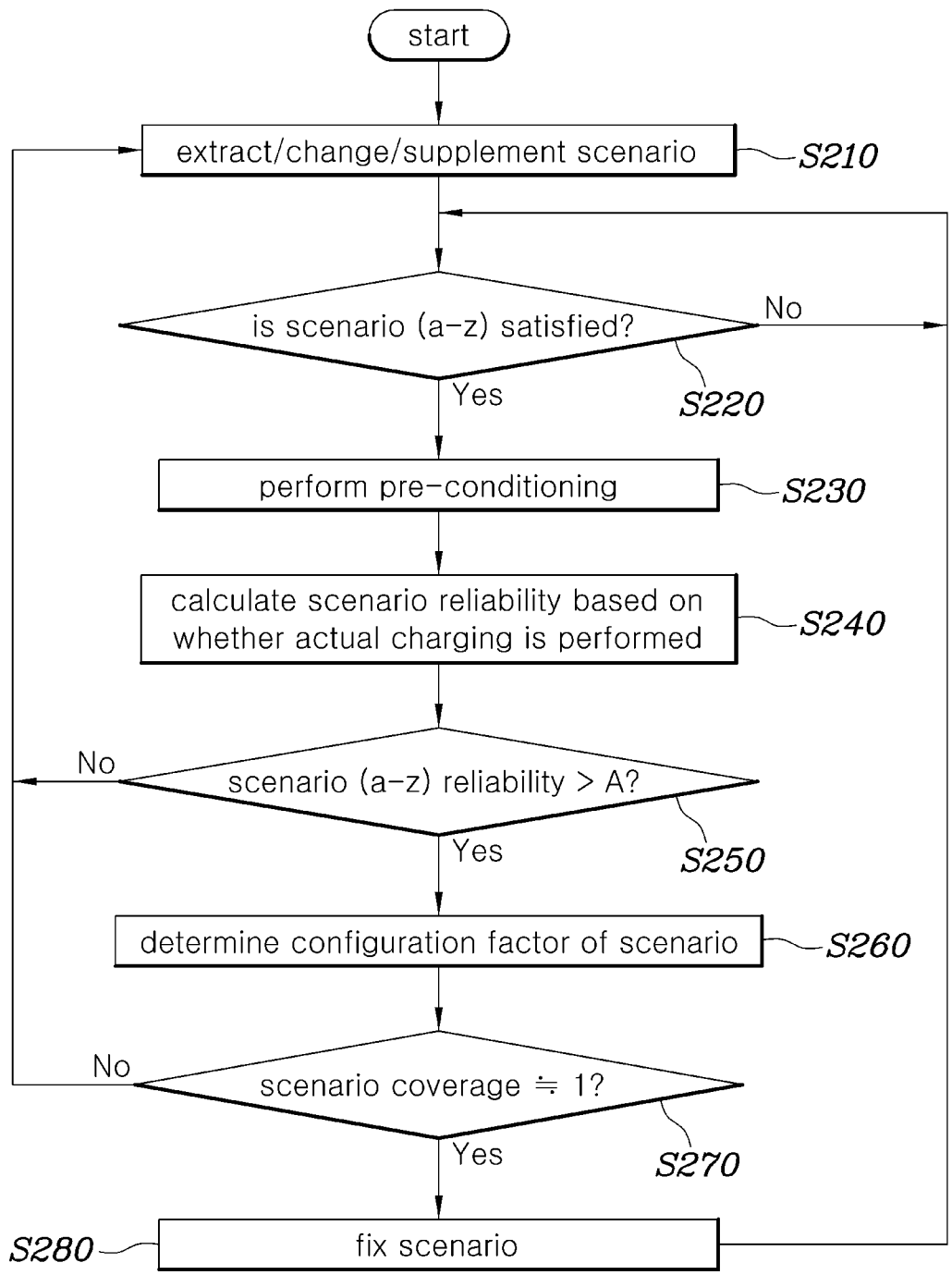
FIG. 4 is a flowchart illustrating a process of updating a charging scenario according to an exemplary embodiment of the present disclosure.

FIG. 1 is a conceptual diagram of a battery conditioning system according to the present disclosure. FIG. 2 is a flowchart illustrating a process of extracting a charge-inducing factor according to an exemplary embodiment of the present disclosure. FIG. 3 is an exemplary diagram illustrating an example of a process of searching for a charge-inducing factor of the present disclosure. FIG. 4 is a flowchart illustrating a process of updating a charging scenario according to an exemplary embodiment of the present disclosure. FIG. 5 is an exemplary diagram illustrating an example of calculating scenario reliability for each scenario according to an exemplary embodiment of the present disclosure.

FIG. 1 is a conceptual diagram of a battery conditioning system according to the present disclosure. The battery conditioning system may be composed of a big data server 100, configured to collect and store vehicle charging tendency factor data, and a processor 200. The processor 200 may be configured to include a charge-inducing factor extractor 210, a scenario unit 230, and a pre-conditioning unit 250, according to roles.

The processor 200, according to an exemplary embodiment of the present disclosure, may be implemented through the processor 200 (not illustrated) configured to perform an operation described below using an algorithm configured to control operations of various components of a vehicle, or a non-volatile memory (not illustrated) configured to store data related to software instructions implementing the algorithm, and data stored in the corresponding memory. Here, the memory and the processor 200 may be implemented as individual chips. Alternatively, the memory and processor 200 may be implemented as a single chip integrated with each other, and the processor 200 may take the form of one or more processors 200.

The big data server 100 may be configured to receive various types of data generated from the one or more vehicles during driving, and may be configured to process, analyze, and store the received data. In particular, the big data server 100 may be configured to classify and store charging-related factors as charging tendency factors based on data input from the vehicle or secondary data generated therethrough.

The charge-inducing factor extraction unit 210 may be configured to select a charging tendency factor having a high charging performance probability as a charge-inducing factor. For example, data such as state of charge (SOC), day of the week, vehicle location, weather, drivable mileage, navigation destination, etc., may be charge-inducing factors.

The scenario unit 230 may be configured to generate at least one charging scenario such that the charging performance probability may be high through a combination of charge-inducing factors. Furthermore, it may be possible to calculate the scenario reliability corresponding to the actual charging probability after pre-conditioning according to the charging scenario for each generated charging scenario.

The pre-conditioning unit 250 may be configured to perform pre-conditioning when a charging scenario condition is satisfied. According to an exemplary embodiment, the pre-conditioning unit 250 may be configured to perform pre-conditioning when one or more conditions of one or more of the at least one charging scenario are satisfied. After pre-conditioning is performed, scenario reliability may be determined according to whether actual charging is performed.

FIG. 2 is a flowchart illustrating a process of extracting a charge-inducing factor according to an exemplary embodiment of the present disclosure.

The big data server 100 may be configured to collect all data related to one or more vehicles. In addition, factors that are highly related to charging may be searched and classified for each collected data item. In this case, the classified factors may be different for each customer, each vehicle class, and each season.

Thereafter, while the vehicle data is continuously collected, the vehicle may be configured to perform charging using an outside charging station. In this case, a charging trigger signal that may indicate a time point at which charging is performed may be transmitted from the vehicle to the big data server 100. According to an exemplary embodiment, when the charging trigger signal is transmitted, it means that charging has been performed, which may be a signal to search for charge-inducing factors among the continuously collected data.

Therefore, the charge-inducing factor may be searched based on when the charging trigger signal is transmitted. For example, when it is determined that the number of times of charging performed on a specific day of the week is significant, or the number of times of charging performed at a certain range of SOCs is significant, 'day of the week' and 'SOC' may be searched for as charge-inducing factors. In addition, detailed conditions may be divided for each data item. Accordingly, when the charging trigger signal is transmitted, the number of times of performing charging may be counted for each condition of each item.

The charging performance probability may be calculated based on the number of times of performing charging for each condition of the searched item. Thereafter, a condition having the highest charging performance probability among detailed conditions may be found, and a probability value of the condition may be calculated as a correlation or factor. In addition, an item whose probability value exceeds a certain set value may be selected and extracted as a charge-inducing factor.

FIG. 3 is an exemplary diagram illustrating an example of a process 300 of searching for a charge-inducing factor of the present disclosure.

First, items related to charging may be searched such as, for example, the SOC 310 or the day of the week 312 corresponding to the remaining battery capacity. In addition, detailed conditions may be divided for each item. For example, in the SOC section, conditions may be subdivided, e.g., into "0-10%," "10%-20%," "20-30%," and "80%—," and, in the case of day of the week, conditions may be subdivided, e.g., into "Mon," "Tues," "Wed," "Thurs," "Fri," "Sat," and "Sun." When charging is performed, the number of times of charging may be counted for the condition at that time. As the charging is repeated, the charging probability may be calculated for each condition of each item.

Taking FIG. 3 as an example, in the items of the SOC section, the 20-30% condition has the highest charging performance probability of 80%, and among the days of the week, Saturday occupies the highest proportion with a charging performance probability of 60%. Furthermore, the probability of the condition having the highest charging performance probability may be calculated as a probability value for each condition of each item, and an item in which the probability value exceeds a certain set value may be extracted as charge-inducing 320.

Taking FIG. 3 as an example, the probability value of the SOC may be calculated as 0.8, which is the probability value of charging performance in the 20-30% section, and the probability value of the day of the week is calculated as 0.6 based on the probability of Saturday. In addition, if the set value is 0.5, both the SOC and the day of the week having probability values exceeds 0.5 may be extracted as charge-inducing factors. The charge-inducing factors extracted in this way may be separately classified for scenario generation 330.

Next, a charging scenario capable of increasing the charging performance probability may be generated through a combination of charge-inducing factors. In this case, each user may have several charging scenarios, and there may be no limit to the number of factors constituting the charging scenarios. Furthermore, depending on the scenario, detailed charge-inducing conditions may be different, even with the same charge-inducing factor.

For example, in the SOC, the charge-inducing condition may be in the range of 20-30% in summer, but may be in the range of 40-50% in winter. In this case, all conditions may be quantified through big data collection and updated in real time, and the higher the charging performance prediction probability, the better the charge-inducing factors and scenarios are configured.

FIG. 4 is a flowchart illustrating a process of updating a charging scenario according to an exemplary embodiment of the present disclosure. Charging scenarios and conditions may be updated in real time with accumulated data as driving/charging is repeated.

First, when several scenarios have already been generated due to the accumulation of vehicle data, the scenarios may be extracted, S210. In this case, if there is no accumulated data, a charging scenario of another vehicle may be shared from the big data server 100. According to an exemplary embodiment, charging scenario sharing may be performed. Charging scenario sharing may comprise sharing, using the big data server 100, a charging scenario generated from each of one or more vehicles with another vehicle, wherein the other vehicle may be configured to use the charging scenario shared with the other vehicle to enable pre-conditioning.

Next, it may be determined whether the extracted charging scenario is satisfied, S220. When at least one or more conditions of the at least one charging scenarios are satisfied, battery pre-conditioning may be performed, S230. In addition, the scenario reliability may be calculated based on whether charging is actually performed after pre-conditioning, S240. Specifically, the scenario reliability may be calculated as an actual number of charging performances after pre-conditioning divided by a number of pre-conditioning performances according to the satisfaction of scenario conditions.

When the scenario reliability exceeds a certain set value, the configuration of the corresponding scenario may be determined, S250 and S260. This means determining the charge-inducing factors constituting the corresponding scenario. If the scenario reliability does not exceed the set value, it may be repeatedly updated to determine whether the scenario is satisfied and to perform the reliability calculation by changing or supplementing the charging scenario again.

When the charging scenario is determined, scenario coverage may be calculated (S270). Determining scenario coverage refers to calculating how much pre-conditioning has been performed according to the charging scenario for total charging, and specifically, it may be calculated as a number of pre-conditioning performances, according to the satisfaction of the one or more conditions of the charging scenario of the at least one charging scenario, divided by a total number of charges. In this case, if there is a significant number of unnecessary pre-conditioning, the scenario coverage value may exceed 1. Therefore, whenever the vehicle is charged, the scenario coverage value may be calculated closer to 1 as the charge after the pre-conditioning by the scenario is performed. When the scenario coverage value approaches 1, the corresponding scenario may be fixed, S280, and maintained without being discarded. If the scenario coverage value is not approaching 1, it may be repeatedly updated to determine whether the scenario is satisfied and to perform the reliability calculation by changing or supplementing the scenario again for a new charging scenario.

FIG. 5 is an exemplary diagram illustrating an example of calculating scenario reliability for each scenario according to an exemplary embodiment of the present disclosure.

In the scenario list 400 according to FIG. 5, four scenario examples may be generated from scenarios A to D. Each user may have several charging scenarios, and the number of factors constituting the charging scenario may not be limited. Furthermore, depending on the scenario, the detailed charge-inducing condition may be different even with the same charge-inducing factor.

Taking FIG. 5 as an example, in scenario A, it may be seen that the scenario reliability may be calculated as 0.5 only with the condition of SOC of 20-30%. In addition, in scenario B, it may be seen that when a vehicle with an SOC of less than 40% is located near the company on Monday, the scenario reliability in which charging was performed is calculated as 0.6. This indicates that even if the scenario reliability is not high with individual charge-inducing factors, several factors may be combined to achieve high reliability.

Furthermore, looking at scenario C, it illustrates that the scenario reliability may be increased to 0.7 even if the SOC remains up to 60% when the estimated driving distance to the destination is 100 km or more, the weather is clear, and it is Saturday. On the other hand, Scenario D illustrates that the reliability is very low at 0.3 unlike Scenario C when the SOC is 40-50% and the weather is cold below 0 degrees Celsius in winter. In other words, even the same charge-inducing factor may generate different scenarios for each detailed condition, and it illustrates that the scenario reliability that is calculated high may vary depending on the combination.

On the other hand, the scenario reliability may be used to determine the combination of charge-inducing factors constituting the scenario. A constant reliability value that may be determined to have high scenario reliability may be set, and when the scenario reliability value exceeds the corresponding set value, the scenario may be determined. Once the scenario is determined, the combination of charge-inducing factors constituting the scenario may be determined, and based on this, big data may continue to be collected, leading to the stage of calculating scenario coverage. If the reliability value does not reach the set value, the process of calculating the reliability again by changing or supplementing the corresponding scenario may be repeated.

As an exemplary embodiment, the scenario generated in the scenario unit may be identified by the driver through the display device, and a specific scenario may be deactivated, modified, or added by the driver's will.

Although illustrated and described with respect to specific embodiments of the disclosure, it will be apparent to those skilled in the art that the disclosure may be variously improved and changed within the limit not departing from the technical idea of the disclosure provided by the following claims.

What is claimed is:

1. A battery conditioning system comprising:
    a big data server configured to collect and store vehicle charging tendency factor data;
    at least one processor in communication with the big data server and configured to,
        select the charging tendency factor with a high charging performance probability as a charge-inducing factor;
        generate at least one charging scenario with the high charging performance probability through a combination of the charge-inducing factors;
        calculate scenario reliability based on an actual charging probability for each of the charging scenario;
        perform pre-conditioning when one or more conditions of one or more of the at least one charging scenario are satisfied;
    wherein the at least one processor is further configured to calculate a scenario reliability value based on an actual number of charging performances after pre-conditioning divided by a number of preconditioning performances according to satisfaction of the one or more conditions of the charging scenario of the at least one charging scenario.

2. The battery conditioning system of claim 1, wherein the at least one processor is configured to:
    calculate an actual charging performance probability value for each of the charging tendency factor; and
    select the charging tendency factor having a probability value equal to or greater than a set value as the charge-inducing factor.

3. The battery conditioning system of claim 1, wherein the at least one processor is configured to:
    calculate a condition with the high charging performance probability for each of the charge-inducing factor as a charge-inducing condition; and
    configure a scenario including the charge-inducing condition.

4. The battery conditioning system of claim 1, wherein the at least one processor is configured to:
    update each charging scenario, of the at least one charging scenario, until the scenario reliability value approaches 1 or repeats charging scenario generation for a new charging scenario; and
    determine, for each charging scenario of the at least one charging scenario, the charge-inducing factor of the charging scenario when the reliability value approaches 1.

5. The battery conditioning system of claim 1, wherein the at least one processor is configured to calculate a scenario coverage value corresponding to a number of pre-conditioning performances, according to satisfaction of the one or more conditions of the charging scenario of the at least one charging scenario, divided by a total number of charges.

6. The battery conditioning system of claim 5, wherein the at least one processor is further configured to:
    update the charging scenario until the scenario coverage value approaches 1 or repeats charging scenario generation for a new charging scenario; and
    fix the charging scenario to maintain a corresponding charging scenario when the scenario coverage value approaches 1.

7. The battery conditioning system of claim 1, wherein:
    the charging scenario generated by the at least one processor is identified by a driver through a display device, and
    a specific charging scenario is deactivated, modified, or added by the driver's will.

8. The battery conditioning system of claim 1, wherein:
    the big data server is further configured to share a charging scenario generated from each of one or more vehicles with another vehicle, and
    the other vehicle is configured to use the charging scenario shared with the other vehicle to enable pre-conditioning.

9. A method for battery conditioning, comprising:
    collecting and storing vehicle charging tendency factor data, using a big data server;
    selecting, by at least processor, the charging tendency factor with a high charging performance probability as a charge-inducing factor;
    generating, by the at least one processor, at least one charging scenario with the high charging performance probability through a combination of the charge-inducing factors;
    determining, by the at least one processor, the at least one charging scenario by calculating scenario reliability based on an actual charging probability for each of the charging scenario; and
    performing, by the at least one processor, pre-conditioning when one or more conditions of one or more of the at least one charging scenario are satisfied; and
    wherein the determining of the at least one charging scenario comprises calculating a scenario reliability value according to an actual number of charging performances after pre-conditioning divided by a number of pre-conditioning performances according to satisfaction of the one or more conditions.

10. The method of claim 9, wherein the determining the at least one charging scenario comprises:
    calculating a condition with a high charging performance probability for each of the charge-inducing factor as a charge-inducing condition; and
    determining the at least one charging scenario by calculating the scenario reliability comprising the charge-inducing condition.

11. The method of claim 9, wherein the determining the at least one charging scenario further comprises:
    updating a charging scenario, of the at least one charging scenario, until the scenario reliability value approaches 1 or repeats charging scenario generation for a new charging scenario; and
    determining the charge-inducing factor of the charging scenario when the reliability value approaches 1.

12. The method of claim 9, wherein the determining the at least one charging scenario comprises:

calculating a scenario coverage value corresponding to a number of pre-conditioning performances, according to satisfaction of the one or more conditions, divided by a total number of charges;

updating the charging scenario until the scenario coverage value approaches 1 or repeats charging scenario generation for a new charging scenario; and maintaining the corresponding scenario when the coverage value approaches 1.

13. The method of claim 9, further comprising performing charging scenario sharing, comprising sharing, using the big data server, a charging scenario generated from each of one or more vehicles with another vehicle, wherein the other vehicle is configured to use the charging scenario shared with the other vehicle to enable pre-conditioning.

* * * * *